United States Patent [19]

Buniff

[11] Patent Number: 4,638,563
[45] Date of Patent: Jan. 27, 1987

[54] TELESCOPING MEASURING STICK WITH SIGNAL MEANS

[76] Inventor: Egbert D. N. Buniff, 23674 Gerrad Way, Canoga Park, Calif. 91307

[21] Appl. No.: 859,715

[22] Filed: May 5, 1986

Related U.S. Application Data

[63] Continuation-in-part of Ser. No. 773,541, Sep. 9, 1985, abandoned.

[51] Int. Cl.4 .................................................. G01B 3/08
[52] U.S. Cl. ....................................... 33/169 R; 33/161
[58] Field of Search ...................... 33/161, 169 R, 158, 33/159, 143 L, 147 N, 172 E, 296, 404, 406, 407; 340/686, 678, 690

[56] References Cited

U.S. PATENT DOCUMENTS

| | | | |
|---|---|---|---|
| 1,799,566 | 4/1931 | Price | 33/161 X |
| 2,245,959 | 6/1941 | Brown | 33/143 J X |
| 2,356,544 | 8/1944 | Swanson | 33/161 |
| 2,715,165 | 8/1955 | Matter et al. | 33/147 N X |
| 3,226,833 | 1/1966 | Lemelson | 33/143 L |
| 3,492,737 | 2/1970 | Swanson | 33/161 |

FOREIGN PATENT DOCUMENTS 2056680  3/1981  United Kingdom .................. 33/161

*Primary Examiner*—Harry N. Haroian
*Attorney, Agent, or Firm*—Cislo & Thomas

[57] ABSTRACT

A telescoping measuring stick having a signal device is provided. The measuring stick is employed in athletic events, such as the high jump and pole vault, to quickly and accurately set the height of the cross-bar. The measuring stick of the invention comprises a hollow outer tubular member, at least one inner slide member, all members marked in gradations of length, a clamp for fixing the height of each inner slide member, and an assembly member attached to the top portion of the inner slide member. The housing member includes a sensor, such as a micro-switch which is depressed upon contact with the cross-bar at the set height, a light and/or sound indicator which is activated upon closure of the micro-switch, and a power supply for providing power to the light and/or sound indicator.

4 Claims, 11 Drawing Figures

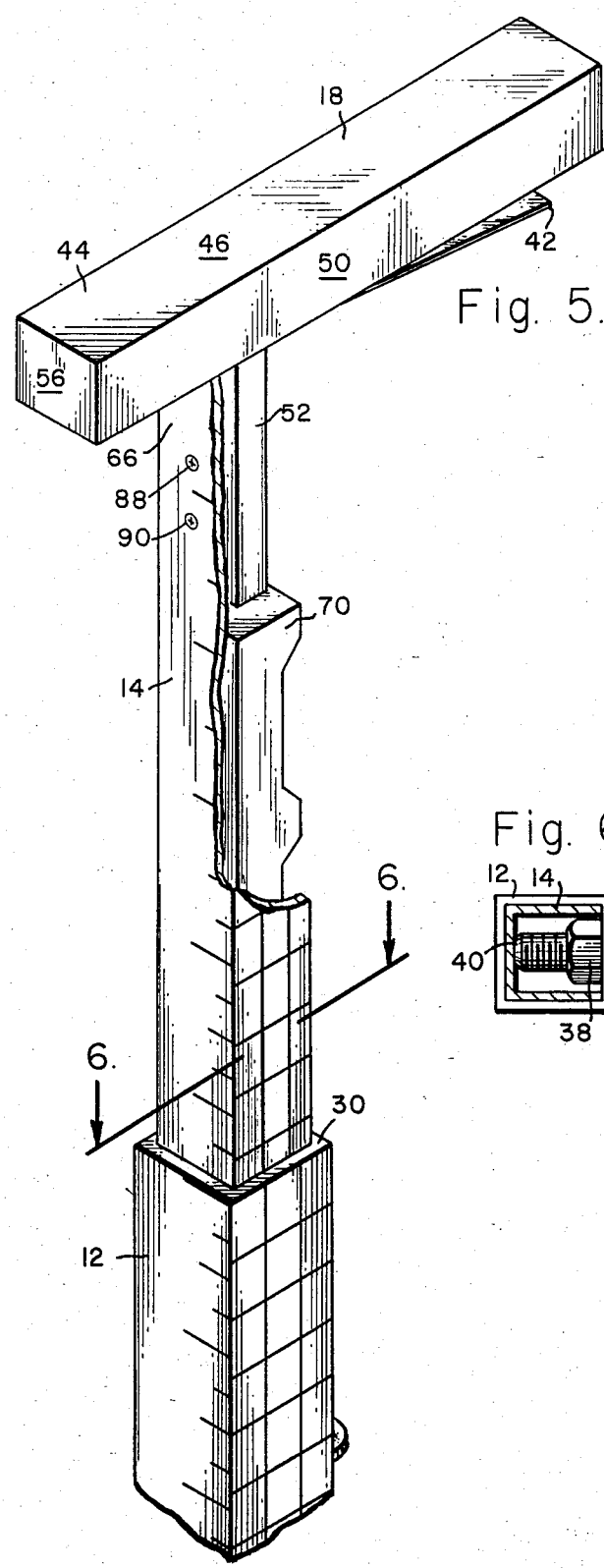

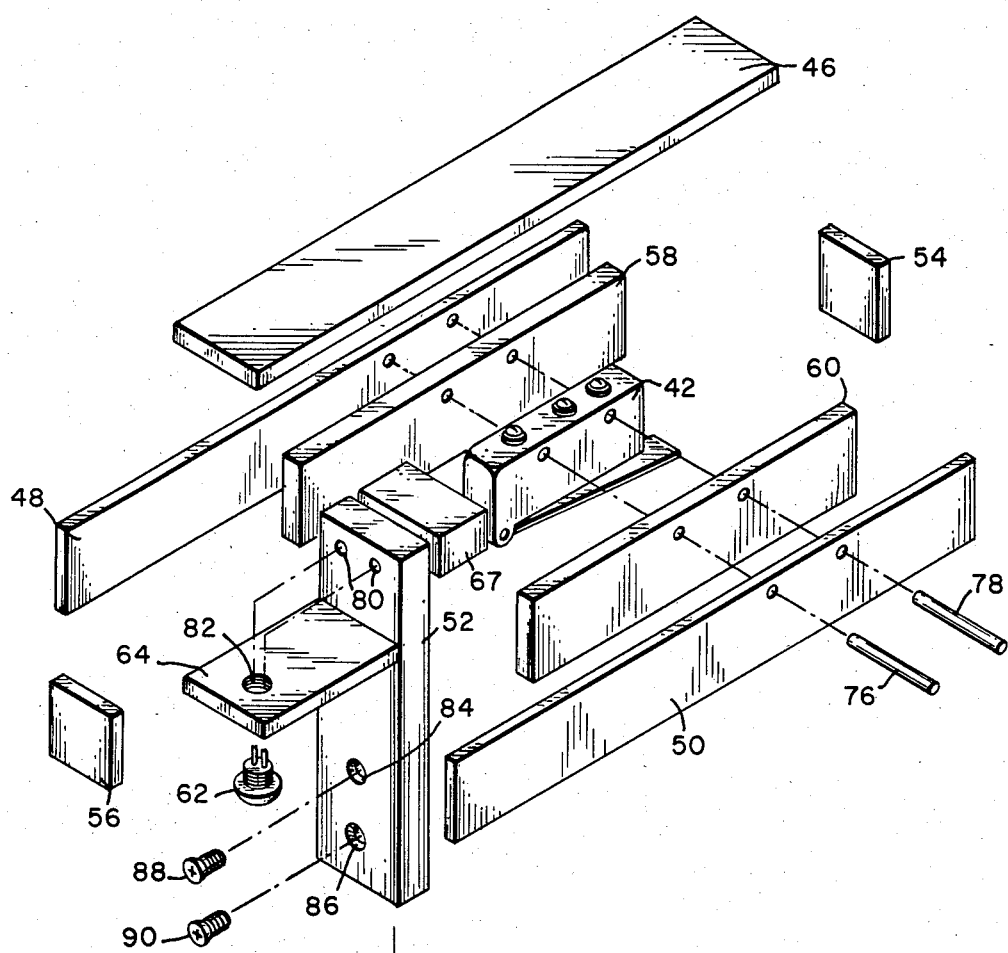
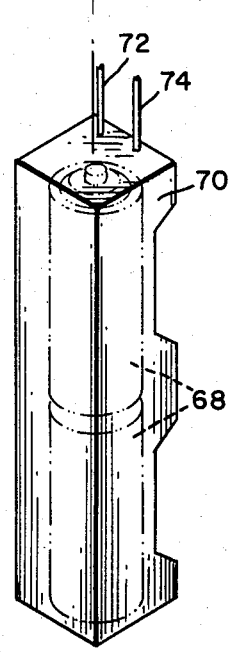
Fig. 7.

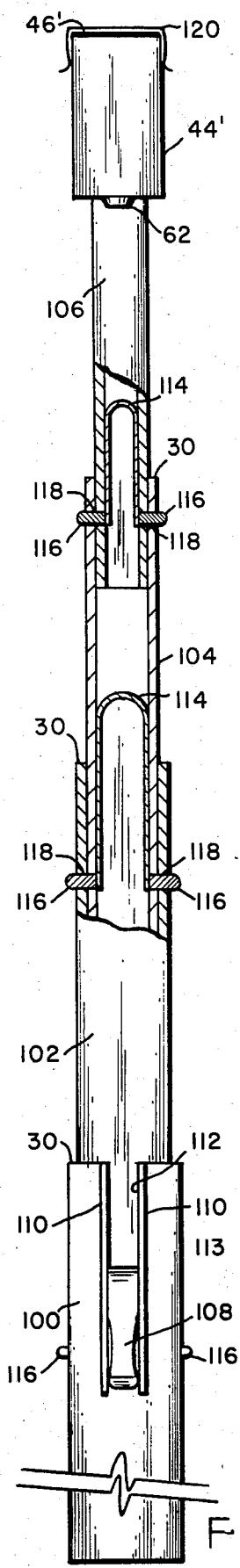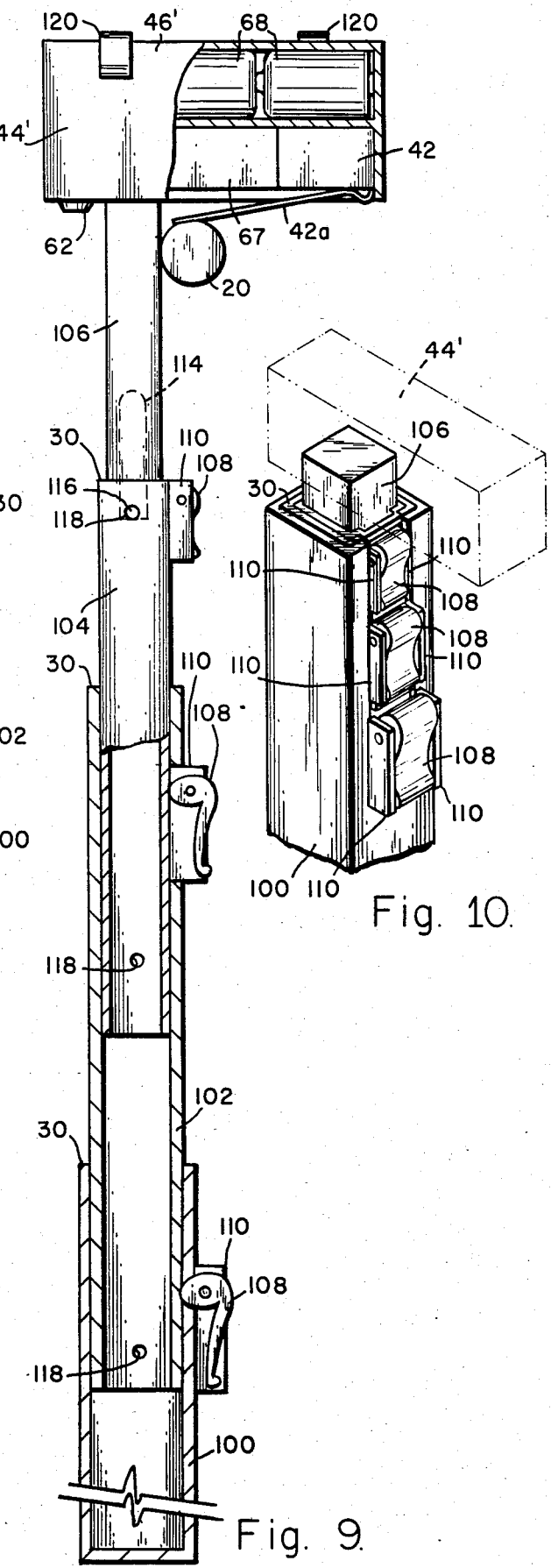

TELESCOPING MEASURING STICK WITH SIGNAL MEANS

CROSS-REFERENCE TO RELATED APPLICATION

The present application is a continuation-in-part application of application Ser. No. 773,541, filed Sept. 9, 1985, now abandoned.

BACKGROUND OF THE INVENTION

This invention relates to measuring sticks of the type commonly employed at athletic events to se the heights of cross-bars, and, more particularly, to a telescoping measuring stick having a signal means for quickly and easily establishing the height of the cross-bar.

At athletic events, it is common to set the cross-bar of events such as the high jump, the pole vault and other similar events employing a variable height cross-bar. Present approaches are tedious, requiring considerable effort and time to accurately set a new cross-bar height.

There are several references disclosing various height indicators, including U.S. Pat. Nos. 3,667,561 and 3,492,737. There are also references which disclose indicating means as the height is changed; these include U.S. Pat. Nos. 4,231,030 and 1,018,328.

However, none of these rferences deals with the problems of the type described above in connectio with athletic events. Hence, there remains a need for a measuring stick that will quickly and accurately permit establishment of the height of a cross-bar at an athletic event.

OBJECTS AND SUMMARY OF THE INVENTION

Accordingly, it is an object of the present invention to provide a measuring stick for use at athletic events which will permit the quick and accurate establishment of the height of a cross-bar.

It is another object of the present invention to provide a telescoping measuring stick having a signal means for aid in establishing the height of the cross-bar.

It is still anothe robject of the present invention to provide a method of quickly and accurately establishing the height of the cross-bar.

It is still further object of the present invention to provide telescoping measuring stick having means to lock extensible parts of the telescoping measuring stick in position.

It is another, yet further object of the present invention to reduce the number of officials required to set the height of the cross-bar, especially in pole vault events.

It is another, still further object of the present invention to set the height of the cross-bar in high jump and pole vault events ina short enough time to prevent athletes awaiting their turn from cooling down.

These and further objects of the invention will become apparent upon a consideratio of the following commentary taken in conjunction with the drawing.

Briefly, a telescoping measuring stick having a signal means is provided for establishing the height of the cross-bar at an athletic event. The measuring stick of the invention comprises (a) a hollow outer tubular member, having marked thereon gradations of length; (b) at least one nested inner slide member adapted to slide longitudinally within the outer tubular member, also having marked thereon gradations of length in association with the gradations of length on the hollow outer tubular member; (c) means for clamping the inner slide member at a pre-selected extended position; and (d) an assembly for detecting the presence or absence of said cross-bar and for providing an indication of the same. The assembly includes means for sensing the presence or absence of the cross-bar, at least one indicating means for indicating the presence or absence of the cross-bar, the indicating means being cooperatively associated with the sensing means, and means for providing a source of power to activate the indicating means upon sensing the presence of the cross-bar. The sensing means may comprise a microswitch, for example. The indicating means may comprise a light indicator, an audio indicator, or both.

In operation, the inner slide members are set to a pre-selected height and the telescoping measuring stick is positioned midway between the posts supporting the cross-bar. The cross-bar is adjusted up or down, as appropriate, until contact is made with the microswitch, thereby closing same and ctivating the indicating means. Upon activation of the indicating means, the cross-bar height is set at the desired position.

Use of the measuring stick of the invention reduces the number of officials required to set the height of the cross-bar. For example, in the pole vault event, up to twelve officials may otherwise be required to set the height.

Also, importantly, use of the measuring stick requires a shorter time than other methods. Consequently, athletes who have warmed up and are awaiting their turn do not suffer cool-down while waiting.

BRIEF DESCRIPTION OF THE DRAWING

FIG. 4 is a side elevational view of the measuring stick of the invention;

FIG. 5 is a perspective view of the head and inner slide member, shown partially extended from the hollow outer tubular member, with the inner slide member depicted in partial cut-away;

FIG. 6 is a cross-sectional view, taken along the line 6—6 of FIG. 5;

FIG. 7 is an exploded view of the sensor/indicator assembly of the measuring stick of the invention, showing the relationship of the parts to each other and of the head to the inner slide member;

FIG. 8 is a front elevational view of an alternate emodiment, partially in cross-section, showing a multi-segmented measuring stick, stuitable for measruing highly positioned cross-bars, such as pole vault crossbars;

FIG. 9 is a side elevational view of the measuring stick of FIG. 8, partially in cross-section and partially in cut-away;

FIG. 10 is a perspective view of the measuring stick of FIG. 8, shown in collapsed configuration;a nd FIG. 11 is a cross-sectional view of FIG. 10.

DETAILED DESCRIPTION OF THE PREFERRED EMBODIMENTS

Figure 1:
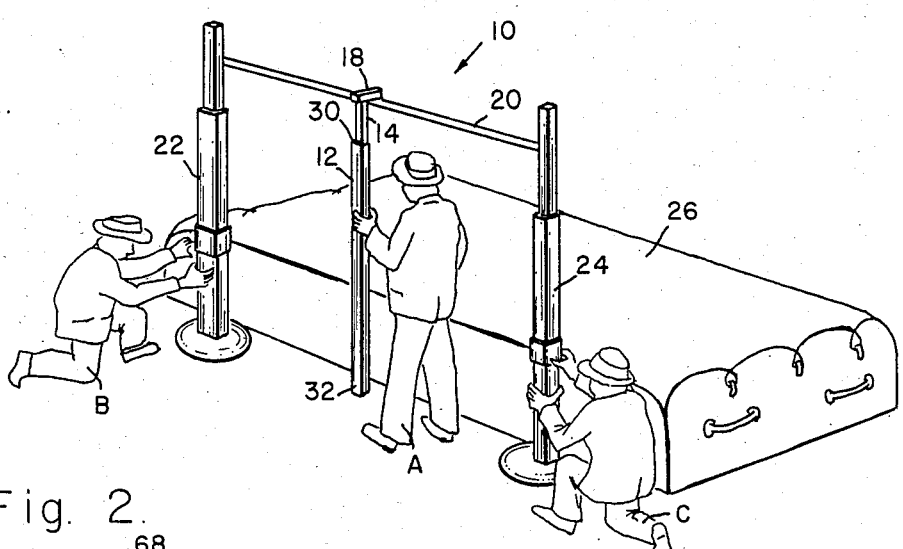
FIG. 1 is a perspective view, showing use of the telescopic measuring stick of the invention, comprising a hollow outer tubular member, an inner slide member and a sensor/indicator assembly, in establishing the height of a cross-bar.
Figure 2:
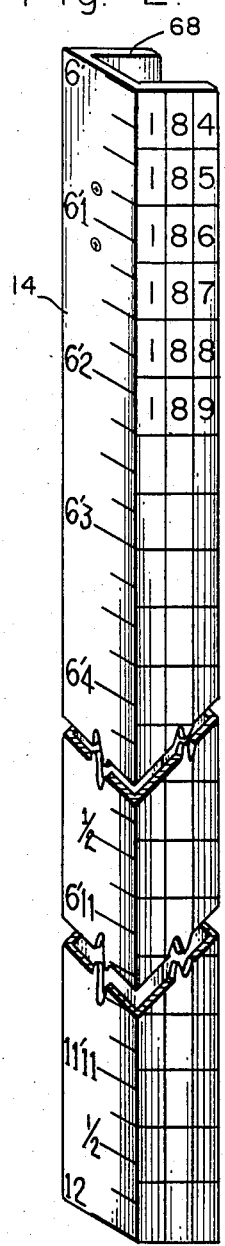
FIG. 2 is a perspective view of the inner slide member of the measuring stick, depicting in detail the gradations of length therealong.
Figure 3:
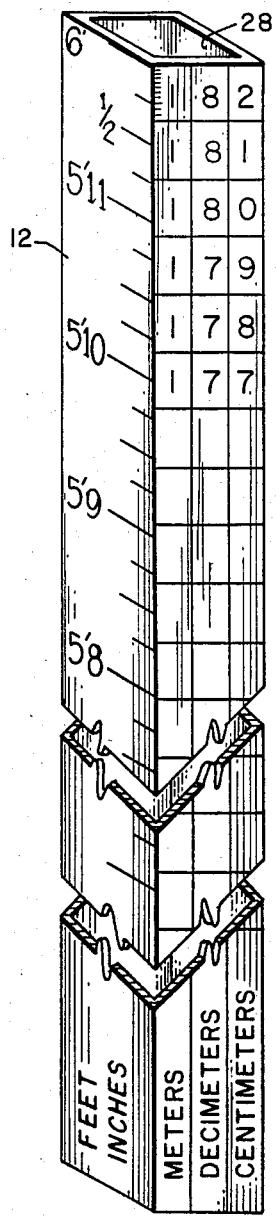
FIG. 3 is a perspective view of the hollow outer tubular member of the measuring stick, depicting in detail the gradation of length therealong.

Referring now to the drawing wherein like numerals of reference indicate like elements throughout, a telescoping measuring stick is generally depicted at 10. The telescoping measuring stick comprises a hollow outer tubular member 12, an inner slide member 14, a clamping means 16 (seen more clearly in FIGS. 4 and 6) and a sensor/indicator assembly member 18.

As shown in FIG. 1, the telescoping measuring stick of the invention is employed to establish the height of a cross-bar 20, which is variably adjustable between support standards 22, 24. In the athletic event depicted in FIG. 1, the high jump, a cushion 26 is provided immediately adjacent the support standards 22, 24 to cushion the athlete's fall after traversing the cross-bar 20.

The hollow outer tubular member 12 and the inner slide member 14 are telescoping parts, and the inner slide member 14 slidably fits int he inside channel 28 of the hollow outer tubular member 12. Both members 12 and 14 are graduated on adjacent surfaces with increments of the English and metric systems of measurement.

The description of the telescoping measuring stick 10 which follows is primarily directed toward use of such a device in the high jump event. However, it will be clear that, with suitable changes, such as described below, the telescoping measuring stick of the invention will be useful in the pole vault event.

The innver slide member 14 comprises a six foot section of a light weight material, preferably aluminum, having a U-shape crosssection or square cross-section. The hollow outer tubular member 12 also comprises a six foot section of a light weight material, also preferably of aluminum, having a square cross-section. Other configurations may also be employed, such as a hollow outer tubular member 12 having a circular cross-section and an inner slide member 14 having a semi-circular cross-section. The inner dimension of the hollow oterof the hollow outer tubular member 12 and the outer dimension of the inner slide member 14 are such as to provide a facile slidable fit, with a minimum of play.

The hollow outer tubular member 12 is graduated on one surface with the English system of measurement, the smallest increment conveniently being one-quarter (¼) inch, and on an adjacent surface it is graduated with the metric system of measurement, the smallest increment conveniently being in centimeters. Sinc the hollow outer tubular member 12 is, in the preferred embodiment, exactly six feet long, the graduations for both the English and metric systems do not coincide. Accordingly, the metric scale's highest increment on the hollow outer tubular member 12 is 1.82 meter, which is less than six feet. Advantageously, the distance between 1.82 and 1.83 meter is thus marked in millimeters.

The English and metric systems of gradations are continued on the corresponding surfaces of the inner slide member 14 and in association with the gradations on the hollow outer tubular member 12, but in a downward manner. thus, as the inner slide member is raised, the new height is always read off of the inner slide member at the top 30 of the hollow outer tubular member 12 (FIGS. 4 and 5). Since the scale on the inner slide member 14 is read from the top down, the reading for 1.83 meter may be read when the inner slide member is extended the appropriate amount. At the bottom or base 32 of the hollow outer tubular member 12, the English system and metric system units are conveniently identified.

a hole 34 is bored into the hollow outer tubular member 12 opposite the English system of markings at a point conveniently just above the five foot mark. The clamp 16, which clamps the inner slide member 14 at a pre-selected extended position, advantageously comprises a thumb screw 36 and a hex nut 38, although other suitable clamping means may also be employed. The hex nut 38 is mounted inside the channel of the U-shape inner slide member 14, and is of a size to permit sliding of the slide member 14. As the thumb screw 36 is tightened, the nut 38 is moved, exerting pressure against the inside of the hollow outer tubular member 12, while the end 40 of the thumb screw 36 exerts clamping pressure against the inside or bight of the inner slide member 14, as depicted in FIG. 6. Thus, a fixed position can be maintained, in the above-described telescoping measuring stick, to a maximum height of about eleven (11) feet. One foot of the inner slide member 14 will remain inside of the hollow outer tubular member 12 to guarantee stability.

The sensor/detector assembly member 18 is employed in the measuring procedure. The assembly member 18 includes a micro-switch assembly 42 maintained in a housing 44 defined bya top 46, two side members 48, 50, a mounting post 52 and end members 54, 56. Shims 58, 60 provide lateral support of the micro-switch 42. All parts of the housing 44 conveniently comprise a sutiable plastic.

A light indicating means, preferably a light emitting diode 62, is provided on the underside of lip 64 of the mounting post 52. The stem of the mounting port 52 is inserted in the top portion 66 of the inner slide member 14.

A sound indicating means, preferably a buzzer 67, is provided within the housing 44. Either or both the light and sound indicating means may be employed in the practice of the invention.

A power supply, conveniently comprising batteries 68 in a battery holder 70, is advantageously mounted in the top portion 66 of the inner slide member 14. Leads interconnect the micro-switch 42, the light emitting diode 62, buzzer 67 and the batteries 68 such that closure of the microswitch 42 activates the light emitting diode 62 and the buzzer 67. The interconnection of such devices in this configuration is well-known, and forms no part of this invention. Two leads 72, 74 are shown in FIG. 7 from the battery supply.

The side members 48, 50 and shims 58, 60 are aligned to the micro-switch assembly 42 and held together by pins 76, 78, which pass through suitably drilled holes in the indicated parts. A pair of holes 80 is provided for leads to the light emitting diode 62, which is screwed into a screw hole 82.

Two mounting holes 84, 86 are provided in the stem of the mounting post 52; a corresponding pair of holes is provided near the top portion 66 of the inner slide member 14. Screws 88, 90 secure the mountin gpost 52 to the upper portion 66 of the inner slide member 14.

As an example of amterial susitably employed in the practice of the invention, the hollow outer tubular mamber 12 may comprise a six foot length of ¾ inch square aluminum tubing having a wall thickness of 1/16 inch, the inner slide member 14 may comprise a six foot length of U-shape aluminum having an outer dimension of ⅝ inch and a wall thickness of 1/16 inch. For the configuration described, the clamp may comprise a ⅜ inch thumb screw and a ⅜ inch hex nut. The thickness of the plastic members comprising the housing 44 is ⅛ inch and is conveniently assembled by cementing the parts together.

The use of the telescoping measuring stick of the invention is depicted in FIG. 1. There, an official A uses the measuring stick in the vertical position, under the center of the cross-bar 20. The height of the telescoping measuring stick 10 is set by adjusting the inner slide member 14 to the desired position, as read along the top 30 of the hollow outer tubular member 12, and tightening the calmp 16. While observing the light emitting diode 62, as well as listening for the buzzer 67, official A instructs officials B and C whether to raise or lower their standards' slides 22, 24 until the exact height at the center of the cross-bar 20 has been reached. Official A then checks the ends of the cross-bar for equal heights. The ends of the cross-bar 20 will always be a little higher than the center due to sag.

An alternate embodiment of the measuring stick, suitable for use in measuring the height of cross-bars placed at a greater height than the high jum, namely, the pole vault, is depicted in FIGS. 8 and 9. There, a measuring stick 10' comprises a pluralty of telescoping members, or nested tubular members, of which four such (100, 102, 104, 106) are depicted. The sides of the nested tubular members are marked with measuring indicia as described above, with the gradations marked of each nested inner segment or slide member 102, 104, 106 in inverse numerical order to that of outer segment 100.

In an exemplary embodiment, the measuring stick 10' may comprise tubular aluminum having a square cross-section and wall thickness of slightly less than 1/16 inch to enable facile sliding of the inner segments. As an example, segment 100 may have an outside diameter of 1 inch, segment 102, of ⅞ inch, segment 104, of ¾ inch, and segment 106, of ⅝ inch.

Each inner segment 102, 104, 106 may be locked into position by locking means 108, such as a cam thumb lock. The cam thumb lock 108 is rotatably secured between side support members 110, which define an open channel 112, which exposes a portion of the nested inner segment. The locking means 108 contacts the exposed portion 113 of the nested inner segment and is thereby urged against the inner slide member in clamping relationship. FIG. 8 illustrates in front elevational view the nested inner segment 102 locked in position by cam thumb lock 108 mounted on outer segment 100.

The length of each channel 112 is configured so as to accomodate the lengths of the cam thumb locks 108 of the succeeding inner segments, as shown in FIGS. 10 & 11. In this manner, the measuring stick of the invention may be fully collapsed, with each inner segment and its cam thumb lock nested in the next outer segment.

A thin metal leaf (not shown) may be included under each cam thumb lock to improve the efficiency of the locking operation and prevent upward movement of an inner segment during locking.

The inner segments 102, 104, 106 are prevented from being inadvertently over-extended by optional detent means 114, which conveniently comprise a springlike U-shaped member, the ends 116 of which are adapted to protrude through openings 118 in the segment immediately encomppassing the inner segment. Advantageously, for stability, the segments 102, 104, 106 are sized to maintain about a one foot length within the surrounding segment.

As each inner segmetn 102, 104, 106 is extended in turn, the ends 116 of the detent means 114 engage openigns 118 in the surround segment 100, 102, 104, respectively.

A housing 44' mounted on top of the innermost segment, here, 106, contains the sensing and indicating means. Specifically, light indicating means 62, such as a light emitting diode, and a sound indicating means 67, such as a buzzer are shown. The housing may include one indicator or the other or both.

The indicating means 62 and 67 are powered by power supply means 68, such as batteries, also maintained in the housing 44'. This configuration provides ready access to the batteries.

The indicating means 62 and 67 are activated by sensing means, such as micro-switch assembly 42, also maintained in the housing 44'. FIG. 9 depicts the physical contact between the cross-bar 20 and the contact 42a of the micro-switch assembly 42.

Access to housign 44' is through top member 46', which is secured to the housing 44' by means of clips 120. The housing 44' is attached to the inner segment 106 as described in connection with the first embodiment.

Operation of the alternate embodiment is substantially the same as described earlier. Each segment is in turn extended and locked into position, starting with the outermost nested segment 102 until the desired height is achieved, and read off at the top 30 of the relevant segment.

for use in setting the bar 20 in high jump events, only the innermost segment 106 need be extended, as shown in FIG. 10. Alternately, a two-segment measuring stick may be constructed, similar to that of the first embodiment, but employing the principles of the second embodiment. However, it will be appreciated that the four-segment embodiment disclosed herein is suitably used in both the high jump and pole vault events.

It will be seen that the method of the invention, employing the telescoping measuring stick described, will result in a more accurate, faster establishment of the height of the cross-bar used in athletic events such as the high jump and the pole vault.

Thus, there has been disclosed a telescoping measuring stick with a signal means. Those skilled in the art will readily perceive obvious changes and modifications, and all such changes and modifications are considered to be within the scope of the invention, being limited only the appended claims.

What is claimed is:

1. A telescoping measuring stick for determining the height of a cross-bar in an athletic event, comprising:
   (a) a hollow outer tubular member, having marked thereon gradations of length;
   (b) at least one nested inner slide member adapted to slide within an outer tubular member, having marked thereon gradations of length in association with gradations of length on said outer tubular member;
   (c) means for clamping said at least one inner slide member at a pre-selected extended position; and
   (d) an assembly for detecting the presence or absence of said cross-bar and for providing an indication of same, said assembly including:
      (1) means for sensing said presence or absence of said cross-bar,
      (2) at least one indicating means for indicating said presence or absence of said cross-bar, said indicating means cooperatively associated with said sensing means, and (3) means for providing a source of power to activate said at least one indicating means upon sensing said presence of said cross-bar: said assembly comprises:

(a) a housing (b) a mounting post for supporting said housing and adapted to be inserted in said inner slide member;

(c) a micro-switch assembly mounted on the bottom of said housing for indicating the height of said cross-bar;

(d) a light emitting diode mounted on said mounting post for indicating closure of said micro-switch;

(e) a buzzer mounted in said housing for indicating closure of said micro-switch; and (f) means for providing a source of power to activate said light emitting diode and said buzzer upon closure of said micro-switch.

2. The telescoping measuring stick of claim 1 herein said source of power comprises a battery pack mounted in the upper portion of said inner slide member and electrically connected to said micro-switch and to said light emitting diode and said buzzer.

3. A telescoping emasuring stick for setting the proper height of a cross-bar in an athletic event, comprising:

(a) a hollow outer tubular member, having a square cross-section and having marked on the exterior thereof gradations of length;

(b) an inner slide member adapted to slide longitudinally within said outer tubular member, haivng a U-shape cross-section and having marked on the exterior thereof gradations of length in association with said gradations of length on said hollow outer tubular member;

(c) means for clamping said inner slide member at a pre-selected extended position, said means comprising a thumb screw threadably maintained in a side wall of said hollow outer tubular member and adapted to exert clamping pressure against said inner slide member; and (d) an assembly attached to the top of said inner slide member, said assembly comprising:

(1) a housing (2) a mounting post for supporting said housing and adapted to be inserted in said inner slide portion, (3) a micro-switch mounted on the bottom of said housing for indicating the height of said cross-bar, (4) a light emitting diode mounted on said mounting post for indicating closure of said micro-switch, (5) a buzzer mounted in said housing for indicating closure of said micro-switch, and (6) means for providing a source of power to activate said light emitting diode and said buzzer.

4. A telescoping measuring stick for setting the proper height of a cross-bar in an athletic event, comprising:

(a) a hollow outer tubular member, having marked on the exterior thereof gradations of length;

(b) a plurality of inner slide members, nested and adapted to slide longitudinally, having marked on the exteriof thereof gradations of length in association with said gradations of length on said hollow outer tubular member;

(c) means for clamping said inner slide members at a pre-selected extended position, said means comprising a cam thumb lock secured to the exterior of a member and adapted to exert clamping pressure against an inner slide member; and (d) an assembly attached to the top of said inner slide member, said assembly comprising:

(1) a housing, (2) a mounting post for supporting said housing and adapted to be inserted to said inner side portion, (3) a micro-switch mounted on the bottom of said housing for indicating the height of said cross-bar, (4) a light emitting diode mounted on said mounting post for indicating closure of said micro-switch, (5) a buzzer mounted in said housing for indicating closure of said micro-switch, and (6) means for providing a source of power to activate said light emitting diode and said buzzer.

* * * * *